US011601531B2

(12) United States Patent
Wang et al.

(10) Patent No.: US 11,601,531 B2
(45) Date of Patent: Mar. 7, 2023

(54) SKETCH TABLE FOR TRAFFIC PROFILING AND MEASUREMENT

(71) Applicant: Intel Corporation, Santa Clara, CA (US)

(72) Inventors: Ren Wang, Portland, OR (US); Yipeng Wang, Portland, OR (US); Tsung-Yuan Tai, Portland, OR (US)

(73) Assignee: Intel Corporation, Santa Clara, CA (US)

(*) Notice: Subject to any disclaimer, the term of this patent is extended or adjusted under 35 U.S.C. 154(b) by 300 days.

(21) Appl. No.: 16/702,261

(22) Filed: Dec. 3, 2019

(65) Prior Publication Data

US 2020/0106867 A1 Apr. 2, 2020

Related U.S. Application Data

(60) Provisional application No. 62/774,718, filed on Dec. 3, 2018.

(51) Int. Cl.
| | |
|---|---|
| *H04L 69/22* | (2022.01) |
| *H04L 43/08* | (2022.01) |
| *H04L 47/35* | (2022.01) |
| *H04L 1/00* | (2006.01) |
| *H04L 67/568* | (2022.01) |

(52) U.S. Cl.
CPC ............ *H04L 69/22* (2013.01); *H04L 1/0016* (2013.01); *H04L 43/08* (2013.01); *H04L 47/35* (2013.01); *H04L 67/568* (2022.05)

(58) Field of Classification Search
CPC ....... H04L 69/22; H04L 1/0016; H04L 1/006; H04L 1/0017; H04L 43/08; H04L 43/026; H04L 43/0876; H04L 47/35; H04L 47/2441; H04L 67/2842; H04L 49/9005; H04L 47/29
See application file for complete search history.

(56) References Cited

U.S. PATENT DOCUMENTS

| | | | |
|---|---|---|---|
| 10,033,613 B1* | 7/2018 | Whiteside | H04L 41/12 |
| 2013/0124786 A1* | 5/2013 | Doering | G11C 5/04 |
| | | | 711/103 |
| 2018/0048571 A1* | 2/2018 | Dharmapurikar | H04L 47/125 |

(Continued)

OTHER PUBLICATIONS

Roughgarden et al., "CS168: The Modern Algorithmic Toolbox Lectures #2: Approximate Heavy Hitters and the Count-Min Sketch", Stanford U., Apr. 3, 2019.

(Continued)

*Primary Examiner* — Habte Mered
(74) *Attorney, Agent, or Firm* — Compass IP Law PC

(57) ABSTRACT

One embodiment provides a network system. The network system includes an application layer to execute one or more networking applications to generate or receive data packets having flow identification (ID) information; and a packet processing layer having profiling circuitry to generate a sketch table indicative of packet flow count data; the sketch table having a plurality of buckets, each bucket includes a first section including a plurality of data fields, each data field of the first section to store flow ID and packet count data, each bucket also having a second section having a plurality of data fields, each data field of the second section to store packet count data.

20 Claims, 8 Drawing Sheets

(56) References Cited

U.S. PATENT DOCUMENTS

2018/0089141 A1* 3/2018 Nakashima ............. G06F 12/08
2018/0239792 A1* 8/2018 Ting ................... G06F 16/2453
2018/0241677 A1* 8/2018 Srebro ............... H04L 47/6255
2019/0253362 A1* 8/2019 Ruthstein ............ H04L 47/2483

OTHER PUBLICATIONS

Sivaraman et al., "Heavy-Hitter Detection Entirely in the Data Plane", ACM SOSR'17, Apr. 3, 2017.
Yang et al., "Elastic Sketch: Adaptive and Fast Network-wide Measurements", ACM Sigcomm 2018, Aug. 20-25, 2018.

* cited by examiner

SKETCH TABLE FOR TRAFFIC PROFILING AND MEASUREMENT

CROSS REFERENCE TO RELATED APPLICATIONS

This application claims the benefit of provisional application Ser. No. 62/774,718, filed Dec. 3, 2018; the contents of which is hereby incorporated by reference in its entirety.

FIELD

The present disclosure relates to a sketch table for network traffic profiling and measurement.

BACKGROUND

Network nodes, e.g., switches and/or routers, in distributed routing systems are designed to be resilient to network changes but are typically not easily reprogrammable once deployed. For example, programming exceptions in their forwarding behavior that do not fit within their pre-specified state machines may be difficult. Software-defined networking (SDN) is configured to alleviate this limitation by exposing a data path of a network node to a centralized controller and thereby providing programmability. However, an SDN-compliant network node may lose the ability to make local decisions (at the node) in response to network changes, requiring the centralized software stack to be involved in every modification of the forwarding behavior thus adding latency. Further, SDN relies on an out-of-band network to connect a control plane to each network node for programming.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

A sketch table and system, method and apparatus for creating the same is disclosed. The sketch table may be used to count packet flows to enable network traffic profiling and count measurements. The methods and systems described herein provide a sketch table that include a "heavy" or "hot" data flow counting section and a "light" or "cold" data flow counting section organized as a single data structure. The sketch table according to at least one embodiment includes a plurality of memory sections or "buckets", where each bucket may include a plurality of heavy entry fields and a plurality of light entry fields. A heavy entry field may store flow identification information ("flow ID") and packet count data, and a light entry field may store count data.

In some embodiments, the memory sketch table described herein may be "cache-aligned", so that each bucket has a byte size that is a non-zero, whole number multiple (e.g., 1, 2, 3, etc.) of the byte size of a cache line. This may enable, for example, increased cache read efficiency by reducing the number of read operations of the cache.

In some embodiments, circuitry is provided to provide promotion, demotion and/or rejection of an entry in the table, for example, to provide space in a full bucket and/or promote/demote packet flow count data to and from heavy sections and light sections.

Figure 1:
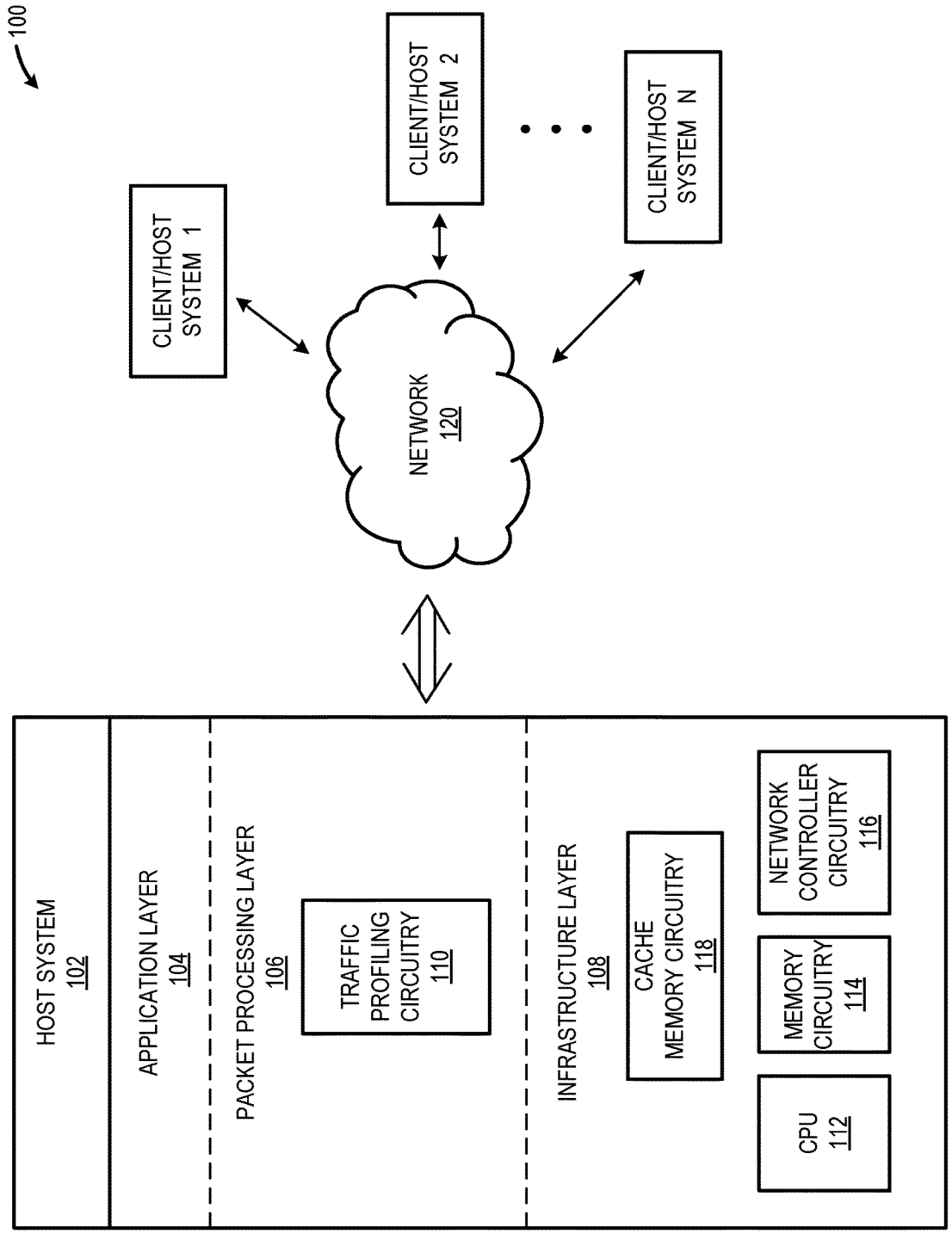
FIG. 1 illustrates a functional block diagram of a network system according to various embodiments of the present disclosure.

FIG. 1 illustrates a block diagram of an example network system 100 according to various embodiments of the present disclosure. The network system 100 includes a host system 102 coupled to one or more host/client systems (host/client system 1, client/host system 2, . . . , host/client system N) via network 120. The host system 102 may be enabled as a software-defined network (SDN) system that may logically and/or physically include an application layer 104, a packet processing layer 106, and an infrastructure layer 108. The infrastructure layer 108 may generally include circuitry and systems as may be associated with a host computer system, for example, a system CPU 112, cache memory circuitry 118, system memory circuitry 114, network controller circuitry 116, etc.

Cache memory circuitry 118 may be associated with and/or integrated with CPU 112 and/or one or more processors (not shown) of the network controller circuitry 116. Cache memory circuitry 118 may have a fixed cache line size, and the size of the cache line may depend upon the CPU 112 and/or network controller circuitry 116. For example, some system CPU architectures use a cache line size of 64 Bytes, 128 Bytes, etc.

The application layer 104 may execute one or more networking applications/containers (not shown) generally defined to generate packet flows to and from the host system 102 and one or more of the client/host systems. A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

The packet processing layer 106, according to the teachings herein, includes traffic profiling circuitry 110 that is generally configured to generate a sketch table that includes flow ID information and count data for heavy data flows and count data for light data flows. The sketch table may be generated, for example, by allocating memory locations (e.g., in memory circuitry 114) to store data in the heavy data fields and light data fields.

As used herein, a "heavy" or "hot" data flow is a flow of data packets that is greater than a "light" or "cold" data flow. For example, a heavy data flow may have a packet count that is orders of magnitude greater than a packet count of a light data flow. In another example, a threshold may be defined to delineate a size of a light data flow verses a heavy data flow. The sketch table and the operation of the traffic profiling circuitry 110 are described in greater detail below.

Figure 2:
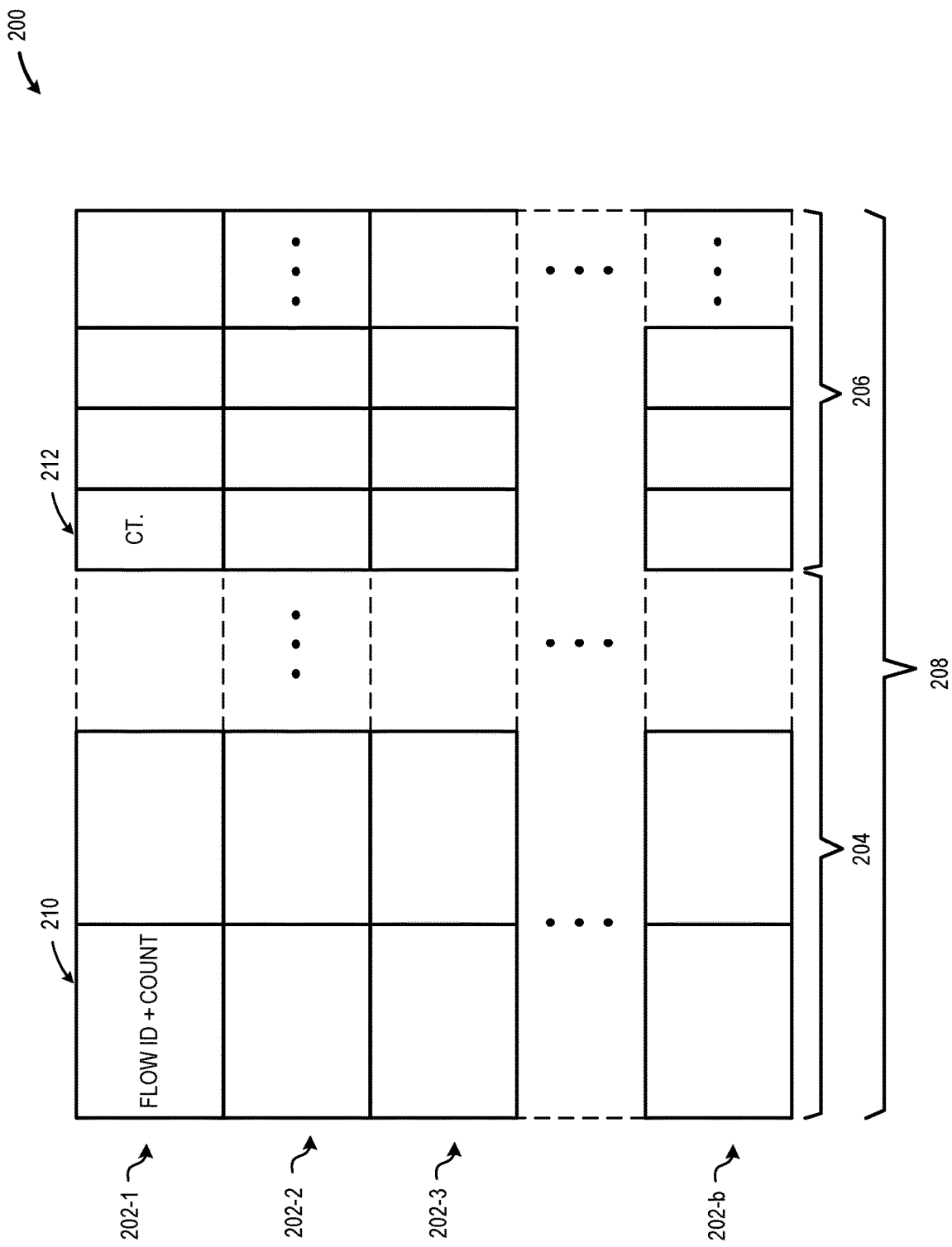
FIG. 2 illustrates a generalized sketch table according to various embodiments of the present disclosure.

FIG. 2 illustrates a generalized sketch table 200 according to various embodiments of the present disclosure. The sketch table 200 generally a plurality of buckets (rows) 202-1, 202-2, 202-3, . . . , 202-b. The sketch table 200 includes a heavy section 204 and a light section 206. The buckets in the heavy section 204 include a plurality of heavy fields (e.g., field 210) to store packet flow ID and packet flow count data. The buckets in the light section 206 include a plurality of light fields (e.g., field 212) to store packet flow count data. The byte size of each bucket (as indicated by 208 as the sum of the heavy section 204 and light section 206), in some embodiments, may be equal to a cache line byte size of cache memory 118 (FIG. 1). Some processing environments may be configured to access multiple cache lines at a time (e.g., 2 cache line read access). Thus, in other embodiments, the size of each bucket may be a non-zero, whole number multiple (e.g., 1, 2, 3, etc.) of the byte size of a cache line. In still other embodiments, the byte size of each bucket may be the cache line size divided by a non-zero, whole number (e.g., 1, 2, 3, etc.), thus allowing for multiple, complete buckets in a single cache line.

In some embodiments, the number of fields in the heavy section 204 and light section 206 may be fixed. In other embodiments, the number of fields in the heavy section and/or light section may be dynamically adjustable, depending on, for example, packet flow characteristics. The heavy fields (e.g., field 210) each generally have a size (in bytes) to enable storing of flow ID information and packet flow count information, and the size of each heavy field may be fixed and or dynamically adjusted to accommodate, for example, very large packet flows, etc. The size of a heavy data field may be adjected, for example, by adjusting a memory size allocated to a heavy field.

Packet flow ID information may be generated using hashing operations, as described below. Similarly, the light fields (e.g., field 212) each generally have a size (in bytes) to enable storing packet flow count information, and the size of each light field may be fixed and or dynamically adjusted to accommodate, for example, very small packet flows, etc.

The maximum number of independent packet flows that may be counted in table 200 is generally defined as the number of buckets (b) X the number of entry fields in both the heavy section 204 and light section 206. In operation, the maximum number of independent packet flows that may be counted in table 200 may be limited to a full bucket. Generally, the larger number of buckets (b) and/or the number of data fields may reduce count errors, at a cost of increasing memory requirements and processing needs of the table 200. Therefore, the overall size of table 200 may be based on, for example, accuracy requirements and bandwidth considerations, etc., and the size of table 200 may be generally determined by: width of table=$\lceil e/\varepsilon \rceil$, depth of table=$\lceil \ln 1/\delta \rceil$, where e is the Euler's number, $\varepsilon$ is error factor and $\delta$ Is error probability.

Figure 3:
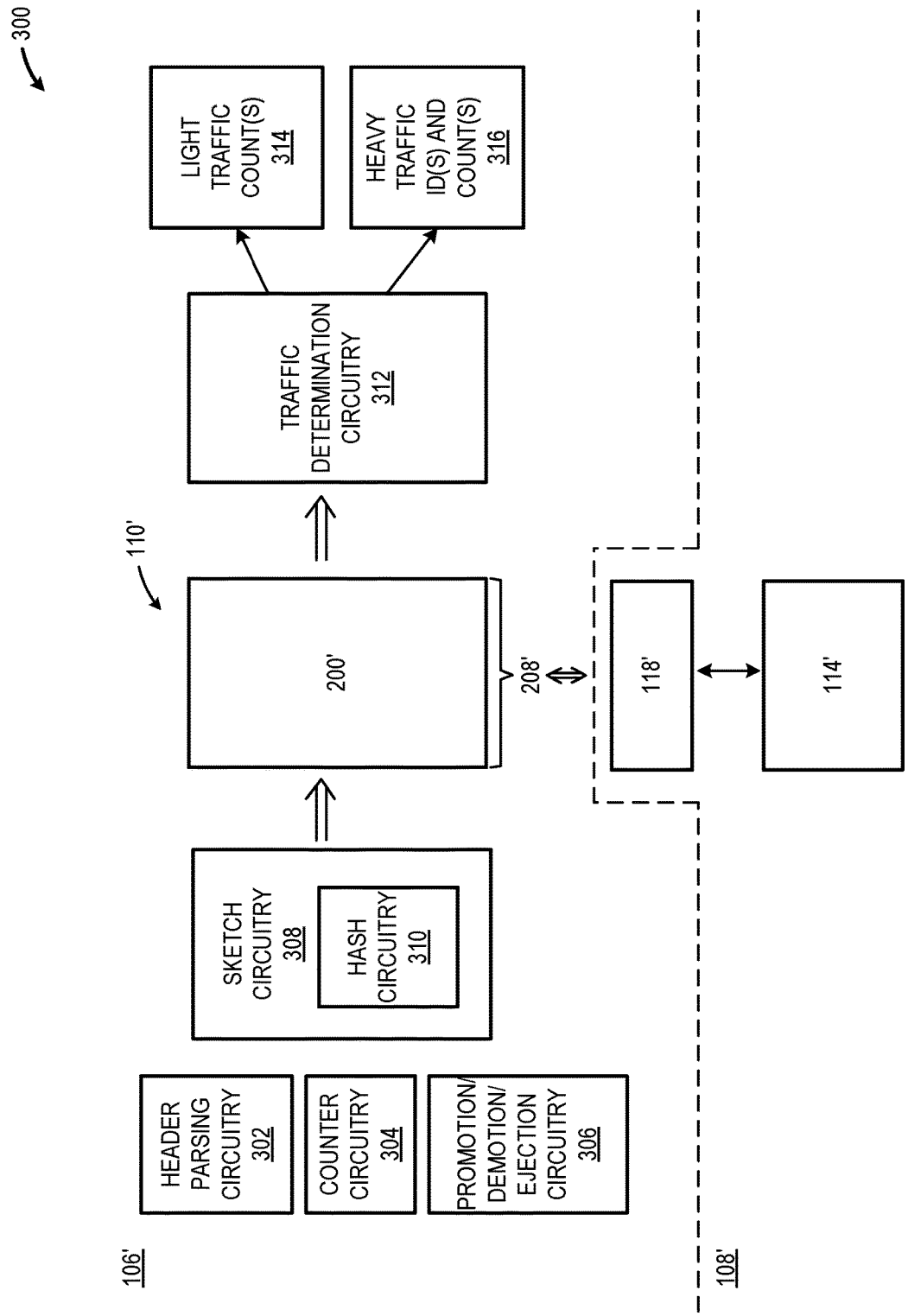
FIG. 3 illustrates traffic profiling circuitry according to one embodiment of the present disclosure.

FIG. 3 illustrates traffic profiling circuitry 110' according to one embodiment of the present disclosure. The profiling circuitry 110' of this embodiment includes header parsing circuitry 302 to parse the header information of one or more packets, as may be generated by the application layer domain 104, to determine flow ID information of the packet(s). Counter circuitry 304 is provided to generate count information that is used in data fields of the sketch table 200'.

In some embodiments, the counter circuitry 304 increments each count in the table 200' by 1, thus each packet of a given flow ID in the heavy section and packet count in the light section may be incremented by "1" as each new packet is generated. In other embodiments, the counter circuitry 304 may increment each count in the table 200' based on a multiple of packets in the flow, for example, incremented for every 10 packets of a given flow, every 100 packets of a given flow, etc. Thus, a count in a data field may be indicative of the overall flow rate of a given flow (e.g., "heaviness" of a flow). In some embodiments, the counter circuitry 304 may also include generate time stamp data associated with a given flow, for example a start/stop time of a flow to enable a time-based metric to measure the flow rate.

Sketch circuitry 308 is generally configured to populate data fields of table 200', using ordered pairs of flow ID and count information in the heavy section data fields, and count information in the light data fields. Flow ID information may include, for example, source IP address, destination IP address, 5-tuple (which may include, for example, TCP and/or UDP, QUIC, etc., source IP address and port number, and destination IP address and port number), etc.

Hash circuitry 310 is generally configured to performing hashing operations of the flow ID information of a packet.

The hash circuitry 310 may utilize the flow ID as a hash key during hashing operations. The hash circuitry 310 may be generally configured to perform hashing operations using known hashing schemes, for example, MOD, CRC, checksum, J-Hash, Murmur, Cuckoo Distributor, etc. and/or proprietary hashing schemes. The hash circuitry 310 may be configured to use a first hash function for inserting flow ID and count data into the heavy section of table 200', and a second hash function for inserting count information into the light section of table 200'. Selection of the first and/or second hash functions, in one embodiment, is based on an anticipated packet flow, for example a quality of service (QoS) requirements, application requirements, type of data flow (e.g., video content), etc.

Sketch circuitry 308 is generally configured to generate the sketch table 200' by mapping the results of hash operations into an entry in the table 200'. As noted above, the sketch circuitry 308 may generate the sketch table 200' in system memory 114' by allocating memory locations for the various fields/buckets of the sketch table 200'. In some embodiments, packet flows are initially mapped into the heavy section of table 200' (using mapped flow ID and count data into a data field) until the heavy section data fields are full, or until an entire bucket is full, or until the entire table is full. Once the heavy section data fields are full, new packet flow counts may be counted in the light section (e.g., without flow ID information). To manage the data fields of a given bucket, the profiling circuitry 110' of this embodiment may also include promotion/demotion/ejection (PDE) circuitry 306.

By way of example, if the heavy section of table 200' is full, PDE circuitry 306 may be configured to determine if one or more packet flow counts in the light section of table 200' exceeds a packet flow count threshold. The packet flow count threshold may be based on, for example, a minimum packet flow count that is to be counted in the table.

In other embodiments, the packet flow count threshold may be dynamically adjusted based on, for example, heuristic packet flow information of the network system, etc. If the packet flow count threshold is exceeded by a packet flow count in the light section of table 200', PDE circuitry 306 may compare that count to one or more counts in the heavy section of table 200'.

If the light count exceeds a heavy count, PDE circuitry 306 in one embodiment demotes the heavy entry into the light entry field and promote the light entry into the heavy entry field. To promote a light entry to a heavy entry field, the light entry may be rehashed using the first hash function, and to demote a heavy entry to a light entry field the heavy entry may be rehashed using the second hash function. If the heavy section of table 200' is full, or an entire bucket is full, PDE circuitry 306 may also be configured to eject one or more entries based on a predefined and/or programmable ejection scheme.

In some embodiments, the ejection scheme may include, for example, ejecting the lowest count entry, ejecting the highest count entry, ejecting middle and/or median count entries, ejecting least recently used packets and/or least recently received packets, etc.

Sketch circuitry 308 may continue to insert entries into the table 200' for a predefined and/or user programmable period of time, using for example, a timer or other timing circuitry (not shown). For example, table 200' may continue being populated until a bucket is full, or for a fixed length of time and/or packet flows, etc. Once the table 200' is full (either a bucket is full or the entire table is full, subject to promotion/demotion/ejection operations described above) and/or a timer has timed out, the table 200' may be stored, for example in system memory 114'.

As described above, the bucket size of table 200' may be a non-zero, whole number multiple (e.g., 1, 2, 3, etc.) of the byte size of a cache line of cache memory 118'. To determine the flow ID and count data of table 200', profiling circuitry 110' of this embodiment may also include traffic determination circuitry 312. Traffic determination circuitry 312 is generally configured to determine count data in the light section of table 200' using the second hash function to generate a set of light traffic count(s) 314. Traffic determination circuitry 312 is also generally configured to determine flow ID and count data in the heavy section 200' using the first hash function to generate a set of heavy flow ID(s) and count(s) 316.

Figure 4:
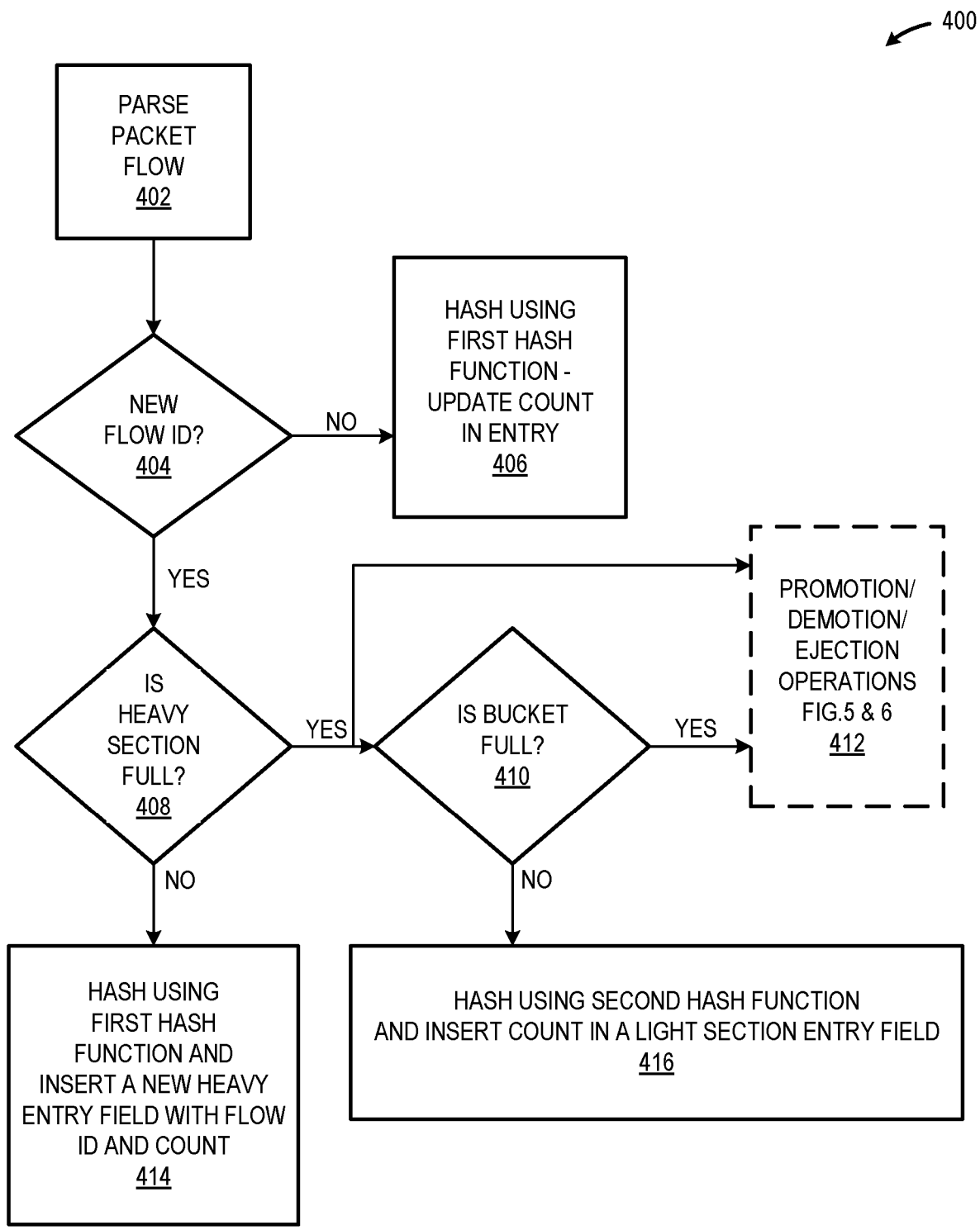
FIG. 4 is a flowchart of sketch table entry insertion operations according to one embodiment of the present disclosure.

FIG. 4 is a flowchart 400 of sketch table entry insertion operations according to one embodiment of the present disclosure. Operations of this embodiment include parsing a packet flow to determine flow ID information of the packet flow 402. Operations of this embodiment also include determining if the flow ID of the parsed packet flow is a new flow ID, or a flow ID that already exists in the sketch table 404. If the flow ID is not new (meaning that flow ID is already in the sketch table), operations include hashing the flow ID information using a first hash function and updating the count entry in the appropriate data field of a heavy section of the sketch table 406.

If the flow ID is new (404), operations include determining if the heavy section of the sketch table is full 408. If the heavy section is full, operations in one embodiment also include performing promotion/demotion/ejection operations 412 (as described above and in FIGS. 5 and 6 below) and/or determining if an entire bucket is full 410. If the heavy section is not full (408), operations include hashing the flow ID information using the first hash function and inserting a new heavy field entry with flow ID and count information 414. If the heavy section is not full (408) and the entire bucket is not full (410), operations may include hashing using a second hash function and inserting a new count in a light section entry field 416.

Figure 5:
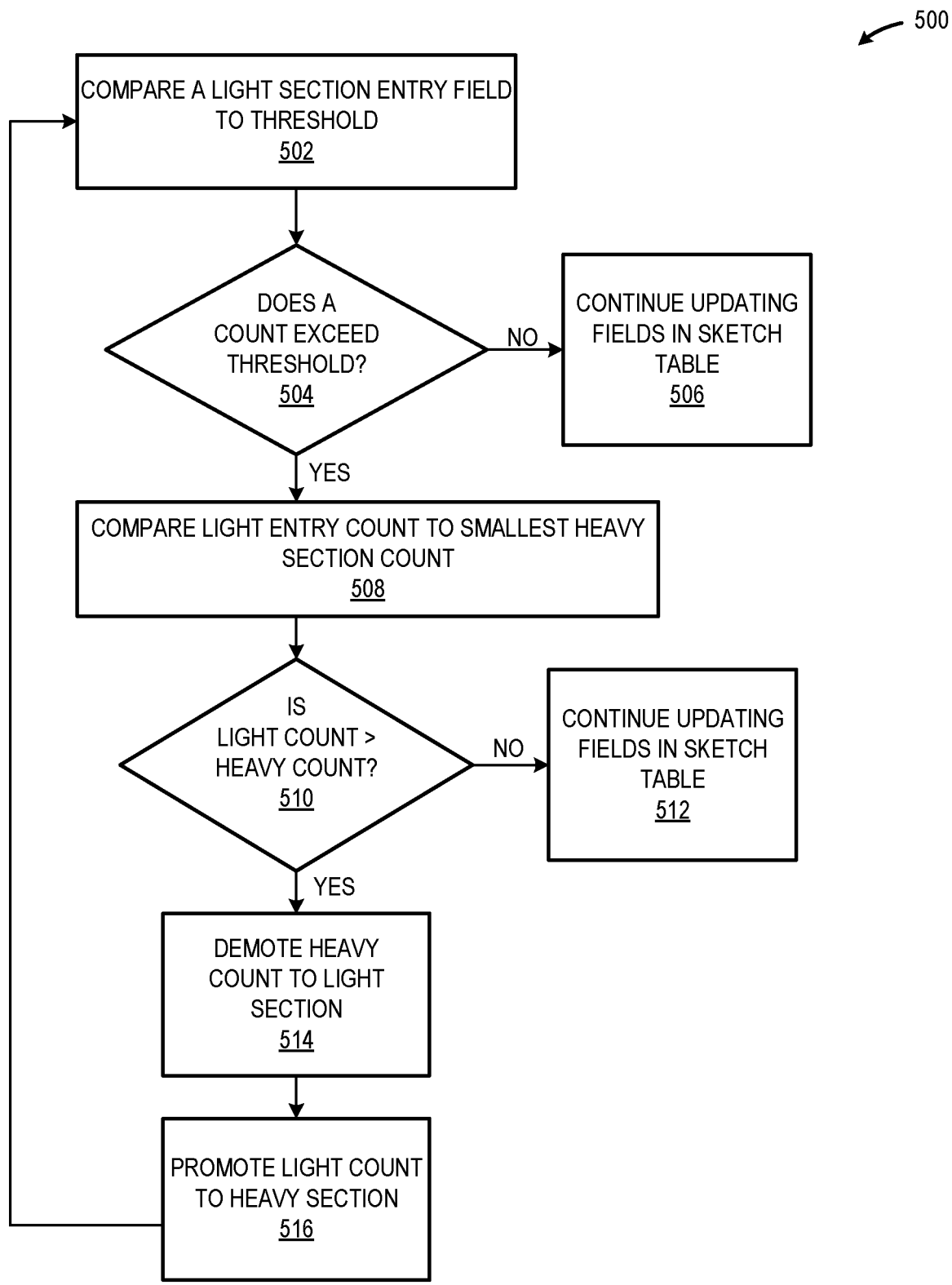
FIG. 5 is a flowchart of sketch table promotion and demotion operations according to one embodiment of the present disclosure.

FIG. 5 is a flowchart 500 of sketch table promotion and demotion operations according to one embodiment of the present disclosure. In particular, the flowchart of FIG. 5 depicts operations of the sketch table when a heavy section of the sketch table is full, or when a bucket of the sketch table is full.

Operations of this embodiment include comparing packet count in a light section entry field to a packet flow count threshold 502, and determining if the packet count in the light section entry field exceeds the packet flow count threshold 504. If the threshold is not exceeded at 504, the sketch table count data continues to be updated 506, as described above. If the count exceeds the packet flow count threshold (504), operations include comparing the light entry count to the smallest count in the heavy section of the sketch table 508, and determining if the light count exceeds the smallest heavy count 510. If the light count does not exceed the smallest heavy count 510, the sketch table count data may continue to be updated 506, as described above. If the light count exceeds the smallest heavy count 510, operations include demoting the heavy count to the light section entry field 514.

Operation 514 may include rehashing the heavy field with a second hash function that is used for hashing operations in the light section of the sketch table. Also, if the light count exceeds the smallest heavy count 510, operations include promoting the light count to the heavy section entry field 516. Operation 516 may include rehashing the light field with a first hash function that is used for hashing operations in the heavy section of the sketch table.

Figure 6:
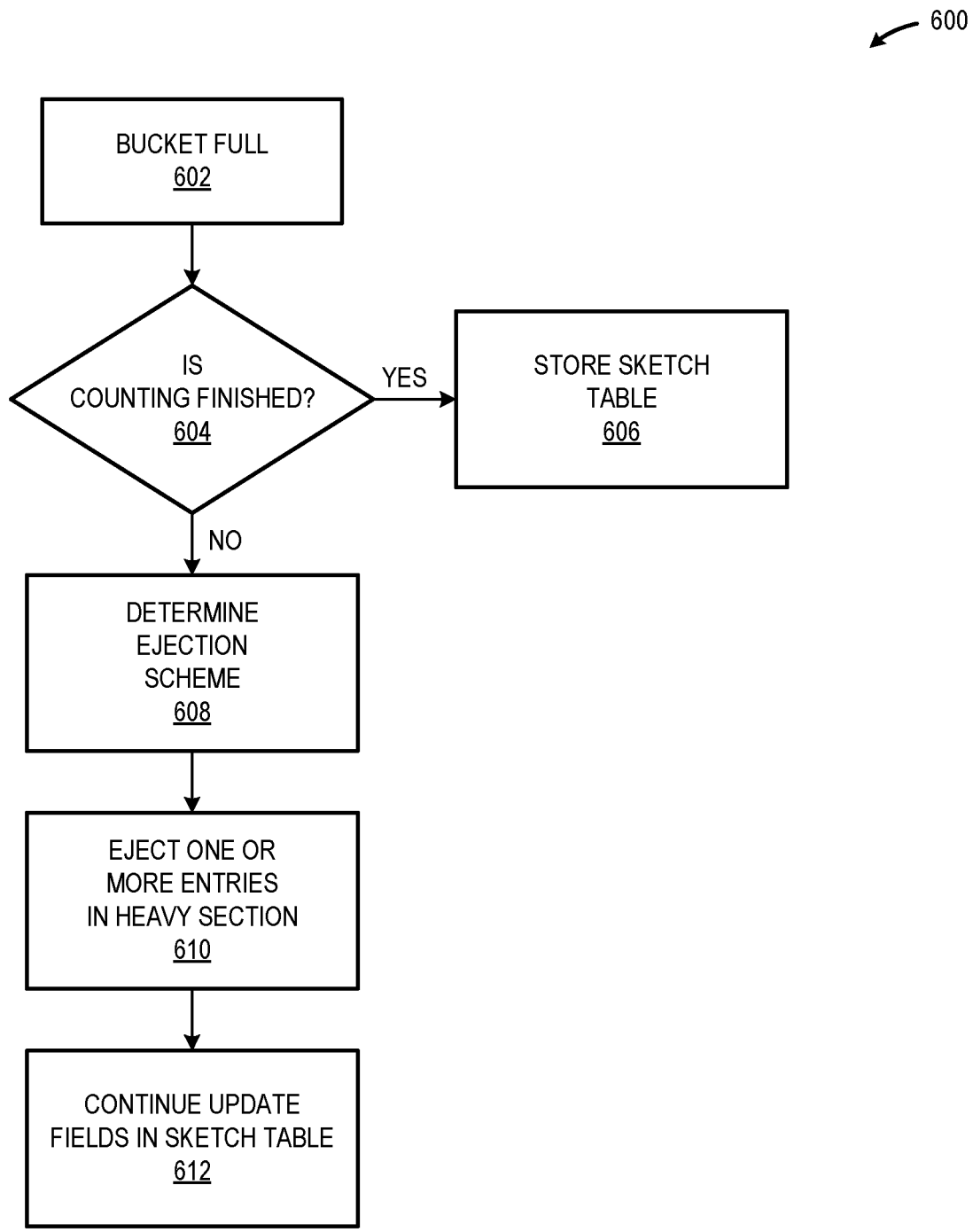
FIG. 6 is a flowchart of termination and ejection operations according to one embodiment of the present disclosure.

FIG. 6 is a flowchart 600 of termination and ejection operations according to one embodiment of the present disclosure. In particular, the flowchart of FIG. 6 depicts operations of the sketch table when a heavy section of the sketch table is full, or when a bucket of the sketch table is full. Operations include determining if a bucket is full 602. A full bucket may be determined, for example, by an allocated memory size for the bucket.

Operations also include determining if packet counts for packet flows in the full buckets are finished 604. "Finished", for operation 604, may mean that a timer has timed out, or that no packet flows remain for known packet flow IDs. If packet counting is finished, the sketch table may be stored 606. If counting is not finished, operations may include determining an ejection scheme for one or more entries of the sketch table 608.

The ejection scheme, generally, defines which entry or entries may be removed from the sketch table, thus freeing up room in the sketch table for additional packet flows. Operations may also include ejecting (removing) one or more entries in the heavy section 610, based on a predefined, user-selectable, and/or programmable ejection scheme, and continuing to update fields in the sketch table with flow ID and count information 612.

While the flowcharts of FIGS. 4, 5 and 6 illustrate operations according various embodiments, it is to be understood that not all of the operations depicted in FIGS. 4, 5 and/or 6 are necessary for other embodiments. In addition, it is fully contemplated herein that in other embodiments of the present disclosure, the operations depicted in FIGS. 4, 5 and/or 6, and/or other operations described herein may be combined in a manner not specifically shown in any of the drawings, and such embodiments may include less or more operations than are illustrated in FIGS. 4, 5 and/or 6. Thus, claims directed to features and/or operations that are not exactly shown in one drawing are deemed within the scope and content of the present disclosure.

Host system 100 and/or client/hosts systems may each further include an operating system (OS) to manage system resources and control tasks that are run on each respective device and/or system. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units.

The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated subsystem such as, for example, a TCP offload engine and/or I/O circuitry. The TCP offload engine circuitry may be configured to provide, for example, packet transport, packet segmentation, packet reassembly, error checking, transmission acknowledgements, transmission retries, etc., without the need for host CPU and/or software involvement.

Host system 102 and/or client/host systems may communicate with each other, via network 120 using a switched fabric communications protocol, for example, an Ethernet communications protocol, Infiniband communications protocol, Fibre Channel communications protocol, etc. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE802.3 Standard", published in March, 2002 and/or later versions of this standard, for example, the IEEE802.3 Standard for Ethernet, published 2012. The Infiniband protocol may comply or be compatible with the Infiniband specification published by the InfiniBand Trade Association (IBTA), titled "InfiniBand™ Architecture Specification", Volume 1, Release 1.2.1, published June 2001 and/or later versions of this specification, for example, InfiniBand™ Architecture, Volume 1 (General Specification), Release 1.2.1, published January 2008 and Volume 2 (Physical Specification), Release 1.3, published November 2012. The Fibre Channel protocol may comply or be compatible with the Fibre Channel specification published by the American National Standards Institute (ANSI), for example, Fibre Channel over Ethernet by INCITS (ANSI) titled BB-5 Rev 2.0 June 2009. Of course, in other embodiments, the switched fabric communications protocol may include a custom and/or proprietary switched fabric communications protocol.

Memory 118 and/or memory 114 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Any of the operations described herein may be implemented in a system that includes one or more tangible storage mediums having stored thereon, individually or in combination, instructions that when executed by one or more processors perform the operations. Also, it is intended that operations described herein may be distributed across a plurality of physical devices, such as processing structures at more than one different physical location. The processor may include, for example, a processing unit and/or programmable circuitry. The storage devices may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

Figure 7:
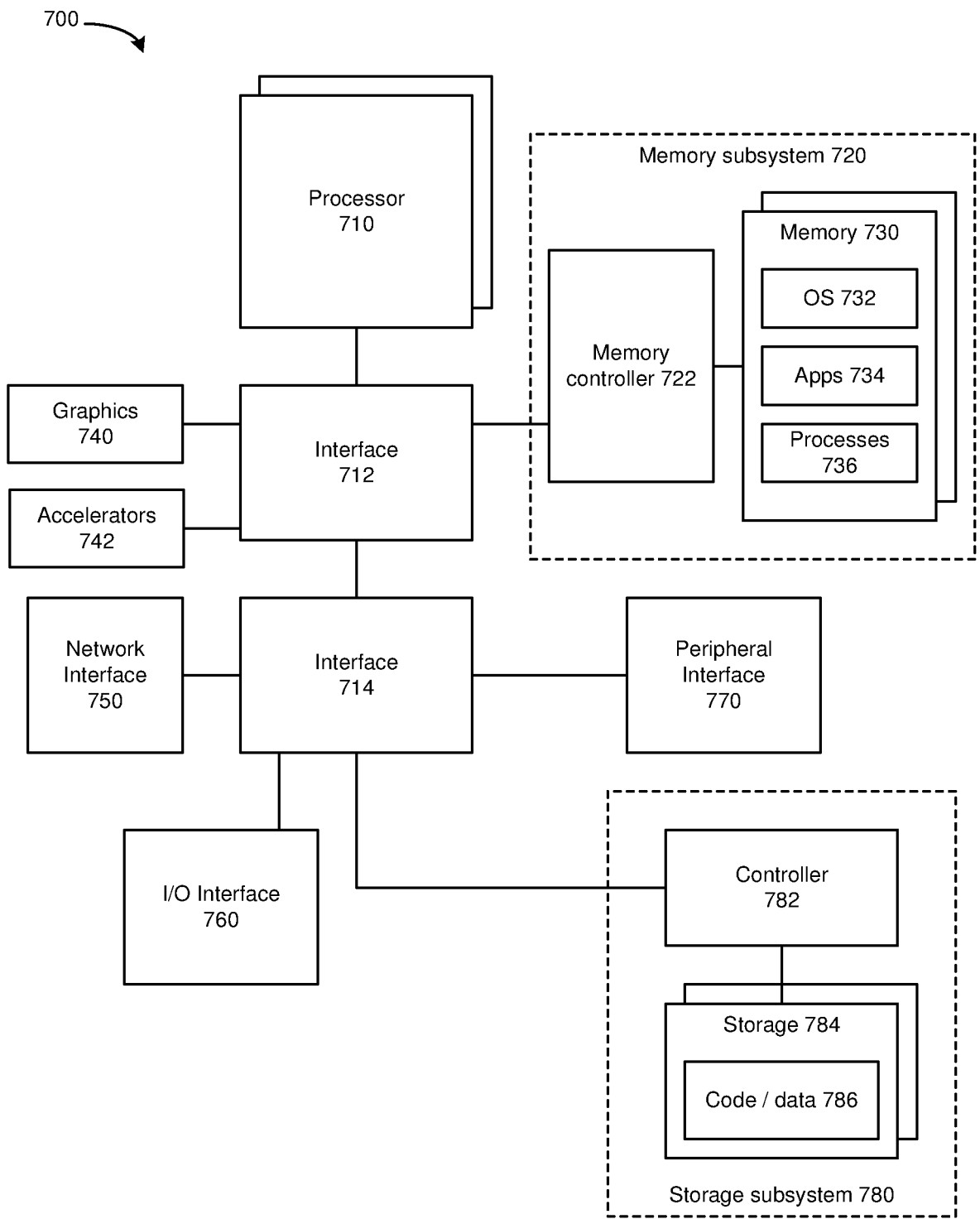
FIG. 7 depicts an example system according to an embodiment.

FIG. 7 depicts an example system 700 according to an embodiment. The system 700 may be utilized. In whole or in part, for the host system 102 and/or one or more of the host/client systems (host/client system 1, client/host system 2, . . . , host/client system N) shown in FIG. 1. The system 700 can use embodiments described herein to generate a sketch table to provide network profiling and management as described herein. System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 500. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (i.e., buses) for coupling appropriate integrated circuits (ICs) and other components mounted to the board.

Various embodiments can be used in a base station that supports communications using wired or wireless protocols (e.g., 3GPP Long Term Evolution (LTE) (4G) or 3GPP 5G), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 8:
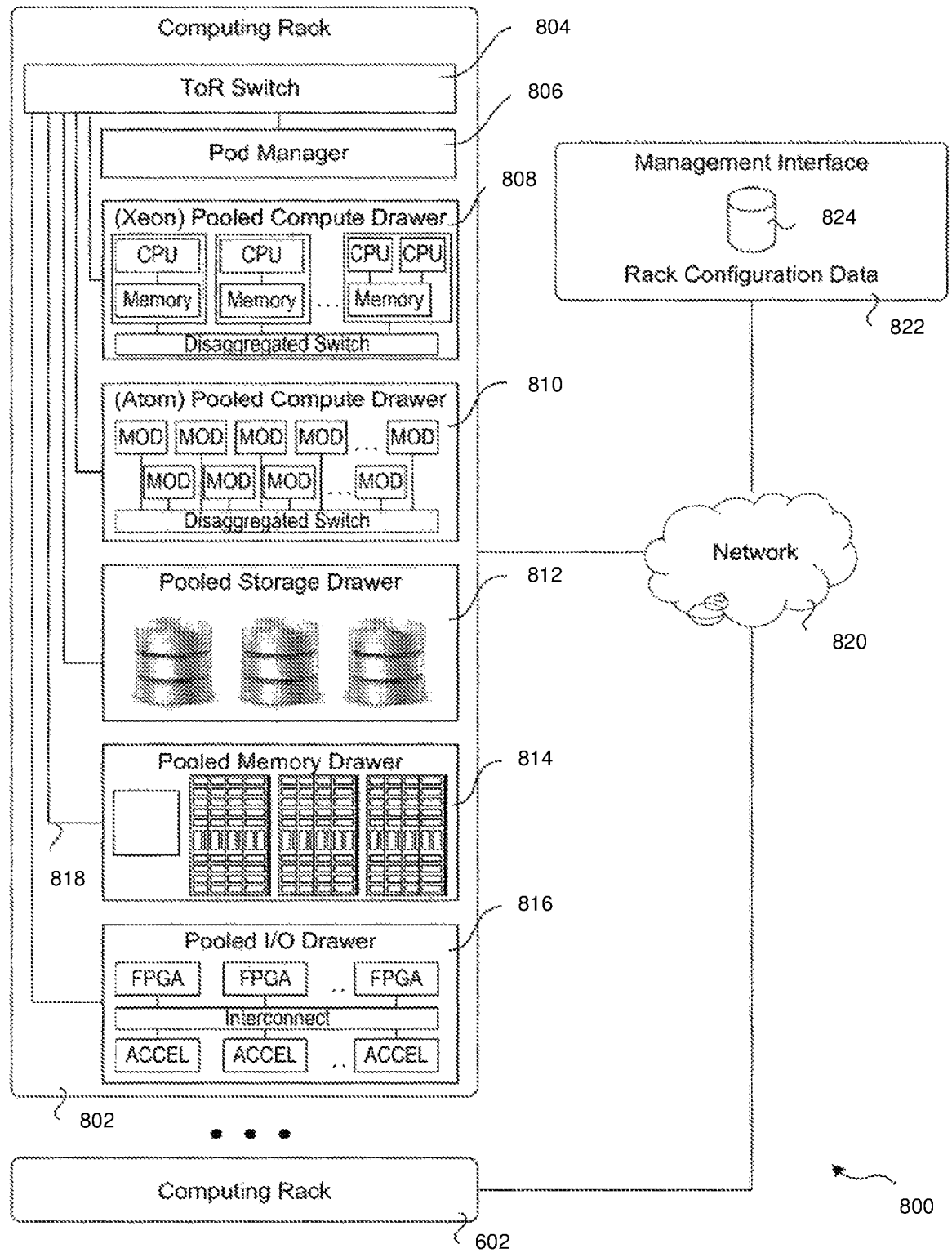
FIG. 8 depicts an example system environment according to an embodiment.

FIG. 8 depicts an example system environment 800 that includes multiple computing racks 802, one or more including a Top of Rack (ToR) switch 804, a pod manager 806, and a plurality of pooled system drawers. Various embodiments can be used among racks to share content or data or results of processing or storing content. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 808, and Intel® ATOM™ pooled compute drawer 810, a pooled storage drawer 812, a pooled memory drawer 814, and a pooled I/O drawer 816. Any of the pooled system drawers is connected to ToR switch 804 via a high-speed link 818, such as a 40 Gigabit/second (Gb/s) or 100 Gb/s Ethernet link or a 100+Gb/s Silicon Photonics (SiPh) optical link, or higher speeds.

Multiple of the computing racks 804 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Environment 800 further includes a management interface 822 that is used to manage various aspects of the environment. This includes managing rack configuration, with corresponding parameters stored as rack configuration data 824.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

"Circuitry", as used in any embodiment herein, may comprise, for example, singly or in any combination, hard-wired circuitry, programmable circuitry, state machine circuitry, and/or firmware that stores instructions executed by programmable circuitry. "Logic", as used herein, may comprise, singly or in any combination circuitry and/or code and/or instructions sets (e.g., software, firmware, etc.).

In some embodiments, a hardware description language may be used to specify circuit and/or circuitry implementation(s) for the various circuitry and/or circuitry described herein. For example, in one embodiment the hardware description language may comply or be compatible with a very high speed integrated circuits (VHSIC) hardware description language (VHDL) that may enable semiconductor fabrication of one or more circuits and/or modules described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, consistent with the teachings of the present disclosure, an apparatus, system and method are configured to provide network traffic profiling and measurement using a sketch table. The sketch table is defined a single data structure to include a plurality of buckets, and each bucket includes both heavy packet flow information using flow ID and count data, and light packet flow information using count data. The single data structure provides increased memory access efficiency (read and write access) in addition to decreasing memory storage requirements of the table. The table may be "cache-aligned" so that the byte size of a bucket may be a non-zero, whole number multiple of the size of a cache line, thus enabling efficient cache memory access. The sketch table may be optimized to promote, demote and/or eject entries between the heavy and light sections, thus improving the accuracy and efficiency of the sketch table.

In at least one embodiment, the sketch table may be generated at a network node (e.g., data plane, switch, router, server, etc.), thus enabling traffic profiling and management at the node level. In one embodiment, providing traffic profiling and management at the node level reduces network-level management overhead and also allows individual nodes to manage packet flows based on local hardware/software resources.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable circuitry devices (PLD), digital signal processors (DSP), field programmable gate array (FPGA), circuitry gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The following example embodiments are provided as a reference for the breadth and scope of the present disclosure, and are not intended as a limitation of the present disclosure.

According to example 1, there is provided a network apparatus that includes header parsing circuitry to parse a header of a data packet having flow identification (ID) information, the data packet being part of a first or second packet flow and being associated with data packets being sent or received by the network apparatus; and sketchcircuitry to generate a sketch table indicative of packet flow count data; the sketch table having a plurality of buckets, a bucket includes a first section including a plurality of data fields, a data field of the first section to store flow ID and packet count data of at least a portion of the data packets having a first flow, a bucket also having a second section having a plurality of data fields, a data field of the second section to store packet count data.

Example 2 may include elements of example 1 and further includes cache memory circuitry, the cache memory circuitry having a cache line byte size; wherein a byte size of each bucket is a non-zero, whole number multiple of the cache line byte size.

Example 3 may include elements of example(s) 1 and/or 2 and further including hash circuitry to hash the flow ID information with a first hash function to generate flow ID and packet count data into a data field of the first section, and to has the embedded flow ID with a second has function to generate packet count data into a data field of the second section.

Example 4 may include elements of example(s) 1, 2 and/or 3 and further including counter circuitry to increment packet count data in the first section and second section based on the flow ID information.

Example 4 may include elements of example(s) 1, 2, 3 and/or 4, further including promotion/demotion/ejection (PDE) circuitry also to compare packet count data of at least one data field of the second section to a packet count threshold and to compare the packet count of the at least one data field of the second section to a packet count in a data field of the second section having a minimum packet count; and wherein the PDE circuitry, based on the comparisons, also to demote a packet count in the first section to the second section by rehashing the packet count and Flow ID in the first section using the second hash function, and promote a packet count in the second section to the first section by rehashing the packet count in the second section using the first hash function.

Example 6 may include elements of example(s) 1, 2, 3, 4 and/or 5, wherein the sketchcircuitry also to determine if the data fields of a bucket are full, and to select and remove at least one data field entry in the first section.

Example 7 may include elements of example(s) 1, 2, 3, 4, 5 and/or 6 wherein the sketchcircuitry also to determine if the data fields of the first section are full, and to select and remove at least one data field entry in the first section.

Example 8 may include elements of example(s) 1, 2, 3, 4, 5, 6 and/or 7 wherein the data fields of the first section to store flow ID and packet count data for heavy packet flows, and the data fields of the second section to store light data flows; wherein a heavy data flow has significantly more data packets than a light data flow.

According to example 9, there is provided a computer-readable tangible storage medium including one or more storage devices having stored thereon, individually or in combination, instructions that, when executed by one or more processors, result in the following operations including:

generate a sketch table indicative of packet flow count data; the sketch table having a plurality of buckets, each bucket includes a first section including a plurality of data fields, each data field of the first section to store flow ID and packet count data, each bucket also having a second section having a plurality of data fields, each data field of the second section to store packet count data;

hash the embedded flow ID information with a first hash function to generate flow ID and packet count data into a data field of the first section, and;

hash the embedded flow ID with a second has function to generate packet count data into a data field of the second section.

Example 10 may include elements of example 9 wherein the instructions that when executed by one or more processors results in the following additional operations including: increment packet count data in the first section and second section based on the embedded flow ID information.

Example 11 may include elements of example(s) 9 and/or 10 wherein the instructions that when executed by one or more processors results in the following additional operations including:

compare packet count data of at least one data field of the second section to a packet count threshold;

compare the packet count of the at least one data field of the second section to a packet count in a data field of the second section having a minimum packet count; and wherein the profiling circuitry, based on the comparisons, also to demote a packet count in the first section to the second section by rehashing the packet count and How ID in the first section using the second hash function, and promote a packet count in the second section to the first section by rehashing the packet count in the second section using the first hash function.

Example 12 may include elements of example(s) 9, 10 and/or 11, wherein the instructions that when executed by one or more processors results in the following additional operations comprising:

determine if the data fields of a bucket are full, and to select and remove at least one data field entry in the first section.

Example 13 may include elements of example(s) 9, 10, 11 and/or 12, wherein the instructions that when executed by one or more processors results in the following additional operations including:

determine if the data fields of the first section are full, and to select and remove at least one data field entry in the first section.

Example 14 may include elements of example(s) 9, 10, 11, 12 and/or 13, wherein a byte size of each bucket is a non-zero, whole number multiple of a cache line byte size.

Example 15 may include elements of example(s) 9, 10, 11, 12, 13 and/or 14 wherein the data fields of the first section to store flow ID and packet count data for heavy packet flows, and the data fields of the second section to store light data flows; wherein a heavy data flow has significantly more data packets than a light data flow.

According to example 16 there is provided a method that includes:

generating a sketch table indicative of packet flow count data; the sketch table having a plurality of buckets, each bucket includes a first section including a plurality of data fields, each data field of the first section to store flow ID and packet count data, each bucket also having a second section having a plurality of data fields, each data field of the second section to store packet count data;

hashing the embedded flow ID information with a first hash function to generate flow ID and packet count data into a data field of the first section, and hashing the embedded flow ID with a second has function to generate packet count data into a data field of the second section.

Example 17 may include elements of example(s) 16, further including:

incrementing packet count data in the first section and second section based on the embedded flow ID information.

Example 18 may include elements of example(s) 16 and/or 17 further including:

comparing packet count data of at least one data field of the second section to a packet count threshold;

comparing the packet count of the at least one data field of the second section to a packet count in a data field of the second section having a minimum packet count;

demoting a packet count in the first section to the second section by rehashing the packet count and Flow ID in the first section using the second hash function; and promoting a packet count in the second section to the first section by rehashing the packet count in the second section using the first hash function.

Example 19 may include elements of example(s) 16, 17 and/or 18 further including:

determining if the data fields of a bucket are full, and to select and removing at least one data field entry in the first section.

Example 20 may include elements of example(s) 16, 17, 18 and/or 19, further including:

determining if the data fields of the first section are full; and selecting and removing at least one data field entry in the first section.

Example 21 may include elements of example(s) 16, 17, 18, 19 and/or 20, wherein a byte size of each bucket is a non-zero, whole number multiple of a cache line byte size.

Example 22 may include elements of example(s) 16, 17, 18, 19, 20 and/or 21, wherein the data fields of the first section to store flow ID and packet count data for heavy packet flows, and the data fields of the second section to store light data flows; wherein a heavy data flow has significantly more data packets than a light data flow.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network apparatus system, comprising:

first circuitry to parse a header of a data packet having flow identification (ID) information, the data packet being part of a first or second packet flow and being associated with data packets sent or received by the network apparatus; and second circuitry to generate a sketch table indicative of packet flow count data, wherein:

the sketch table comprises a plurality of buckets, a bucket includes a first section including a first data field to store a flow ID and packet count data of at least a portion the data packets associated with the first or second packet flow, the bucket also comprising a second section comprising a second data field to store packet count data of at least a portion the data packets but not store flow ID associated with the first or second packet flow, the first section is to store at least one data field associated with one or more heavy flows, and the second section is to store at least one data field associated with one or more light flows.

2. The network apparatus of claim 1, further comprising cache memory circuitry, the cache memory circuitry having a cache line byte size; wherein a byte size of at least one bucket is a non-zero, whole number multiple of the cache line byte size.

3. The network apparatus of claim 1, further comprising third circuitry to hash the flow ID information with a first hash to generate flow ID and packet count data into a data field of the first section, and to hash the flow ID with a second hash to generate packet count data into a data field of the second section.

4. The network apparatus of claim 1, further comprising fourth circuitry to increment packet count data in the first section and second section based on flow ID information.

5. The network apparatus of claim 3, further comprising promotion/demotion/ejection (PDE) circuitry to compare packet count data of at least one data field of the second section to a packet count threshold and to compare the packet count of the at least one data field of the second section to a packet count in a data field of the second section having a minimum packet count; and wherein the PDE circuitry, based on the comparisons, also to demote a packet count in the first section to the second section by rehashing the packet count and Flow ID in the first section using the second hash function, and promote a packet count in the second section to the first section by rehashing the packet count in the second section using the first hash function.

6. The network apparatus of claim 1, wherein the second circuitry is also to determine if the data fields of a bucket are full, and to select and remove at least one data field entry in the first section.

7. The network apparatus of claim 1, wherein the second circuitry is also to determine if the data fields of the first section are full, and to select and remove at least one data field entry in the first section.

8. The network apparatus of claim 1, wherein the data field of the first section to store flow ID and packet count data for heavy packet flows, and the data field of the second section to store light data flows; wherein a heavy data flow has more data packets than a light data flow.

9. A non-transitory computer-readable tangible storage medium including one or more storage devices having stored thereon, individually or in combination, instructions that, when executed by one or more processors, result in the following operations comprising:
generate a sketch table indicative of packet flow count data;
the sketch table comprising a plurality of buckets, a bucket includes a first section including a plurality of data fields,
said bucket also comprising a second section having a plurality of data fields;
hash flow ID information with a first hash function to generate flow ID and packet count data into a data field of the first section, and;
hash the flow ID with a second hash function to generate packet count data into a data field of the second section, wherein the data fields of the first section are to store flow ID and packet count data for heavy packet flows and the data fields of the second section are to store packet count data but not store flow ID for light data flows.

10. The computer-readable tangible storage medium of claim 9, wherein the instructions that when executed by one or more processors results in the following additional operations comprising:
increment packet count data in the first section and second section based on the flow ID information.

11. The computer-readable tangible storage medium of claim 9, wherein the instructions that when executed by one or more processors results in the following additional operations comprising:
compare packet count data of at least one data field of the second section to a packet count threshold; and compare the packet count of the at least one data field of the second section to a packet count in a data field of the second section having a minimum packet count; and based on the comparisons, also to demote a packet count in the first section to the second section by rehashing the packet count and Flow ID in the first section using the second hash function, and promote a packet count in the second section to the first section by rehashing the packet count in the second section using the first hash function.

12. The computer-readable tangible storage medium of claim 9, wherein the instructions that when executed by one or more processors results in the following additional operations comprising:
determine if the data fields of a bucket are full, and to select and remove at least one data field entry in the first section.

13. The computer-readable tangible storage medium of claim 9, wherein the instructions that when executed by one or more processors results in the following additional operations comprising:
determine if the data fields of the first section are full, and to select and remove at least one data field entry in the first section.

14. The computer-readable tangible storage medium of claim 9, wherein a byte size of at least one bucket is a non-zero, whole number multiple of a cache line byte size.

15. A method comprising:
generating a sketch table indicative of packet flow count data the sketch table comprising a plurality of buckets, at least one bucket includes a first section including a plurality of data fields, at least one data field of the first section to solely store flow ID, at least one bucket also comprising a second section comprising a plurality of data fields, at least one data field of the second section to store flow ID and packet count data;
hashing flow ID information with a first hash function to generate flow ID and packet count data into a data field of the first section, and
hashing the flow ID with a second hash function to generate packet count data into a data field of the second section, wherein the data fields of the first section are to store flow ID and packet count data for heavy packet flows and the data fields of the second section are to store packet count data but not store flow ID for light data flows.

16. The method of claim 15, further comprising:
incrementing packet count data in the first section and second section based on the flow ID information.

17. The method of claim 15, further comprising:
comparing packet count data of at least one data field of the second section to a packet count threshold;
comparing the packet count of the at least one data field of the second section to a packet count in a data field of the second section having a minimum packet count;
demoting a packet count in the first section to the second section by rehashing the packet count and Flow ID in the first section using the second hash function; and
promoting a packet count in the second section to the first section by rehashing the packet count in the second section using the first hash function.

18. The method of claim 15, further comprising:
determining if the data fields of a bucket are full, and to select and removing at least one data field entry in the first section.

19. The method of claim 15, further comprising:
  determining if the data fields of the first section are full; and
  selecting and removing at least one data field entry in the first section.

20. The method of claim 15, wherein a byte size of at least one bucket is a non-zero, whole number multiple of a cache line byte size.

* * * * *